March 11, 1969 H. I. MEISNER 3,432,114
FISHING REEL WITH DRAG MEANS
Filed Feb. 16, 1966

INVENTOR.
HERBERT I. MEISNER
BY
ATTORNEY

March 11, 1969 H. I. MEISNER 3,432,114
FISHING REEL WITH DRAG MEANS
Filed Feb. 16, 1966 Sheet 2 of 2
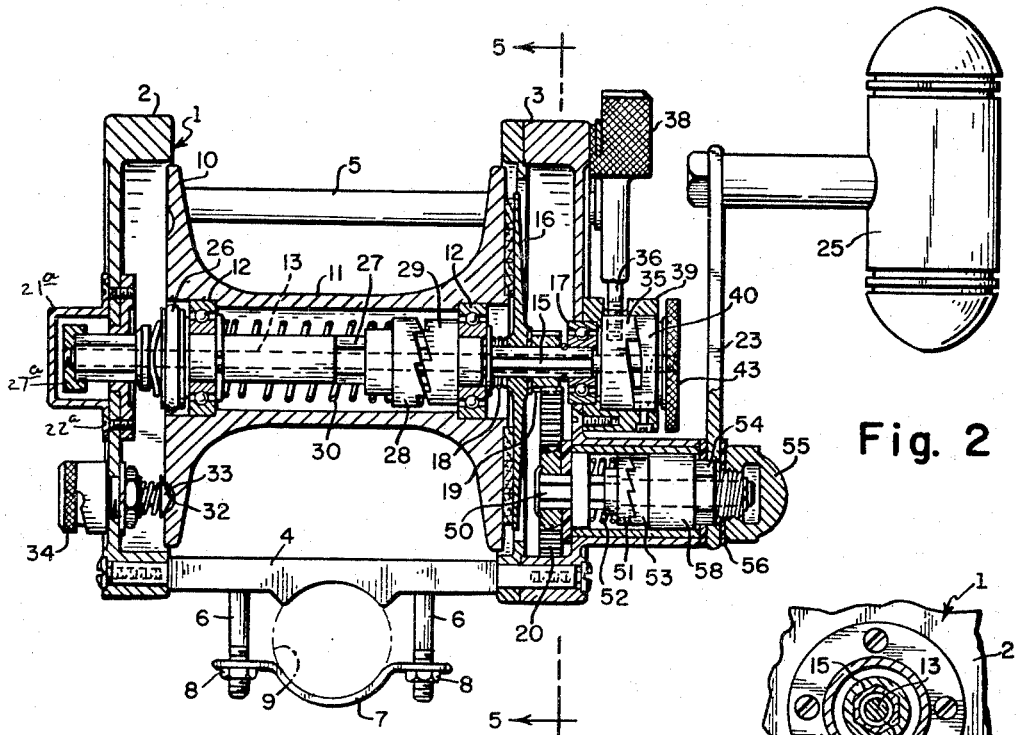
Fig. 2
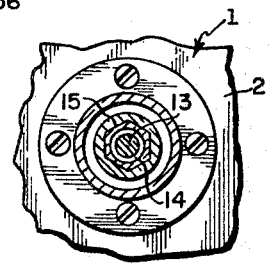
Fig. 6
Fig. 7
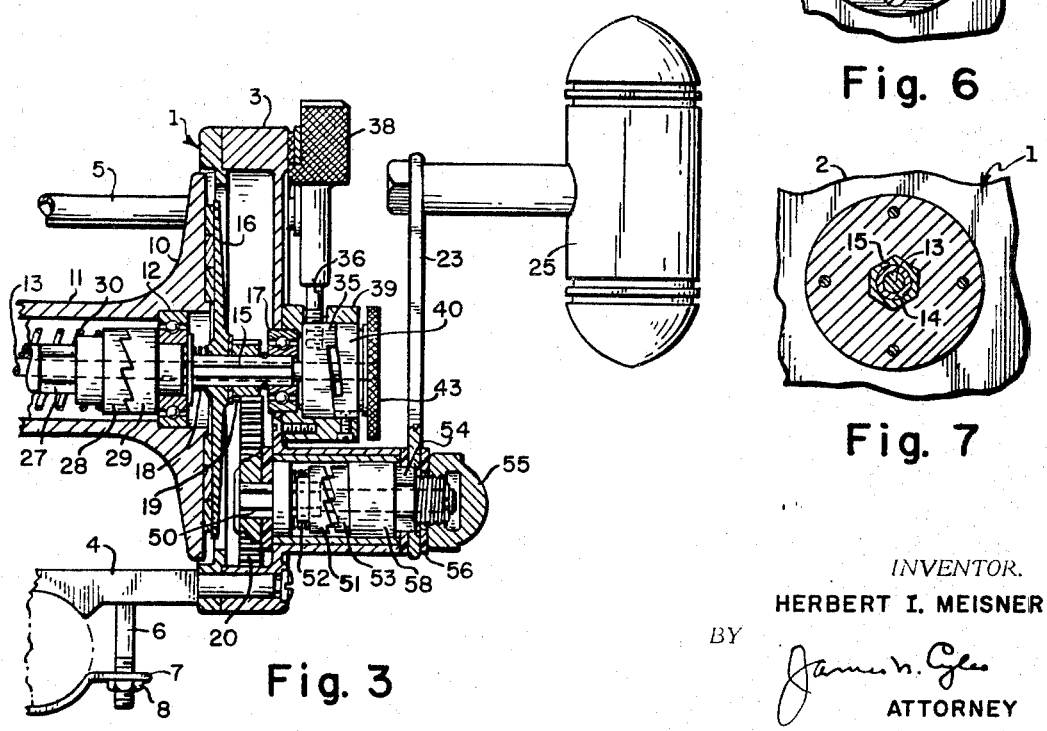
Fig. 3
INVENTOR.
HERBERT I. MEISNER
BY *James N. Glee*
ATTORNEY United States Patent Office 3,432,114
Patented Mar. 11, 1969

3,432,114
FISHING REEL WITH DRAG MEANS
Herbert I. Meisner, 60 W. 22nd St., Hialeah, Fla. 33010
Filed Feb. 16, 1966, Ser. No. 530,249
U.S. Cl. 242—84.45
Int. Cl. A01k 89/02
3 Claims

ABSTRACT OF THE DISCLOSURE

A fishing reel having a crank-operated, gear drive including a friction disk carried by the drive. A manually-operated lever shifts a cam to draw the spool shaft and spool toward the friction disk to provide an overload release, spool drive. Reverse rotation of the disk is prevented by an anti-reverse having confronting toothed members, one member being yieldably shiftable on but fixed against rotation on a shaft element carried by the frame, and the other being fixed for rotation with the friction disk so as to provide a drag against the unwinding of a line from the spool. The spool may be rotated by oscillating the drive crank connected to the spool via ratchet elements.

---

This invention relates to fishing reels, and has for one of its objects the provision of a reel in which means is provided for effecting a regulation of the braking force or drag on the spool.

The fisherman also finds that upon various occasions, and particularly when a fish of substantial size and vigor is hooked, that the winding in of the fish by the normal rotative movements of the reel crank is difficult if not impossible. It is therefore one of the objects of the present invention to provide a reel construction that includes a ratchet means by which the winding or reeling in of the fish can, when desired, be effected with a step-by-step procedure obtained by a rocking or back-and-forth swing of the crank to thereby intermittently rotate the spool to thus gradually retract the fishing line and bring in the hooked fish.

More particularly, the invention contemplates the provision of a reel provided with a lever and attached cam means associated with the lever and by which the braking force imposed on the spool can be regulated, and also a reel in which a ratchet means is associated with the crank and which permits back-and-fourth swing of the crank when desired, as distinguished from a continuous rotary movement thereof, to thereby secure intermittent rotation of the spool and step-by-step retraction of the line.

The invention further contemplates the provision of other features which will be apparent to those skilled in this art.

With these and other objects to be hereinafter set forth in view, I have devised the arrangement of parts to be described and more particularly pointed out in the claims appended hereto.

In the accompanying drawings, wherein illustrative embodiments of the invention are disclosed, FIG. 1 is an end elevational view, with parts broken away, and other parts shown in section, of a reel constructed according to the invention;

FIG. 2 is a sectional view, taken substantially on the line 2—2 of FIG. 1, looking in the direction of the arrows;

FIG. 3 is a detail view of a part of the reel shown in FIG. 2;

FIG. 6 is a sectional view, taken substantially on the line 6—6 of FIG. 4, looking in the direction of the arrows; and FIG. 7 is a sectional view, taken substantially on the line 7—7 of FIG. 4, looking in the direction of the arrows.

Figure 4:
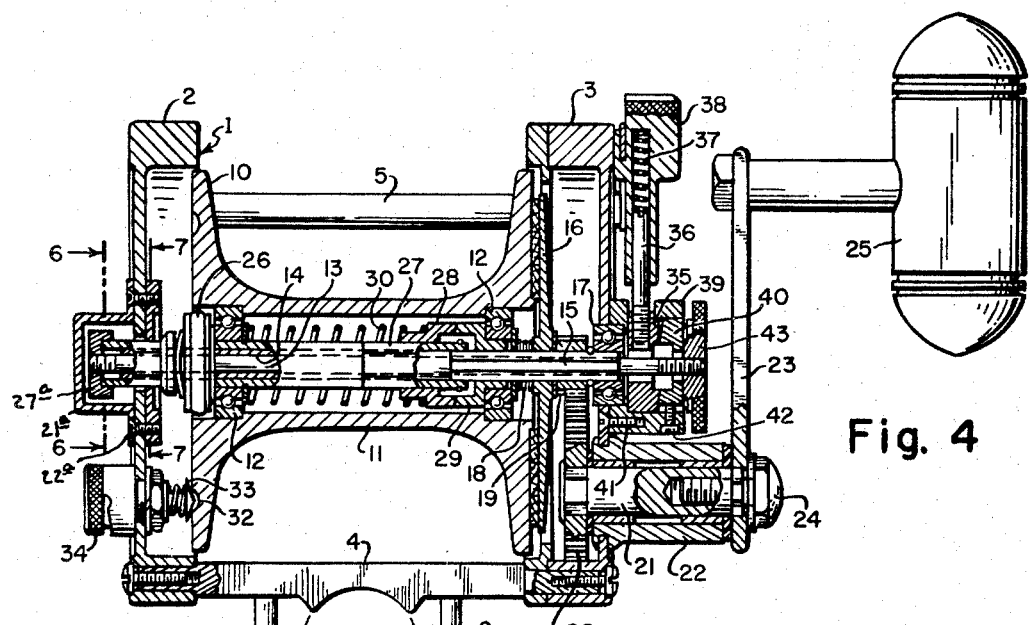
FIG. 4 is a sectional view of another embodiment of the invention.
Figure 5:
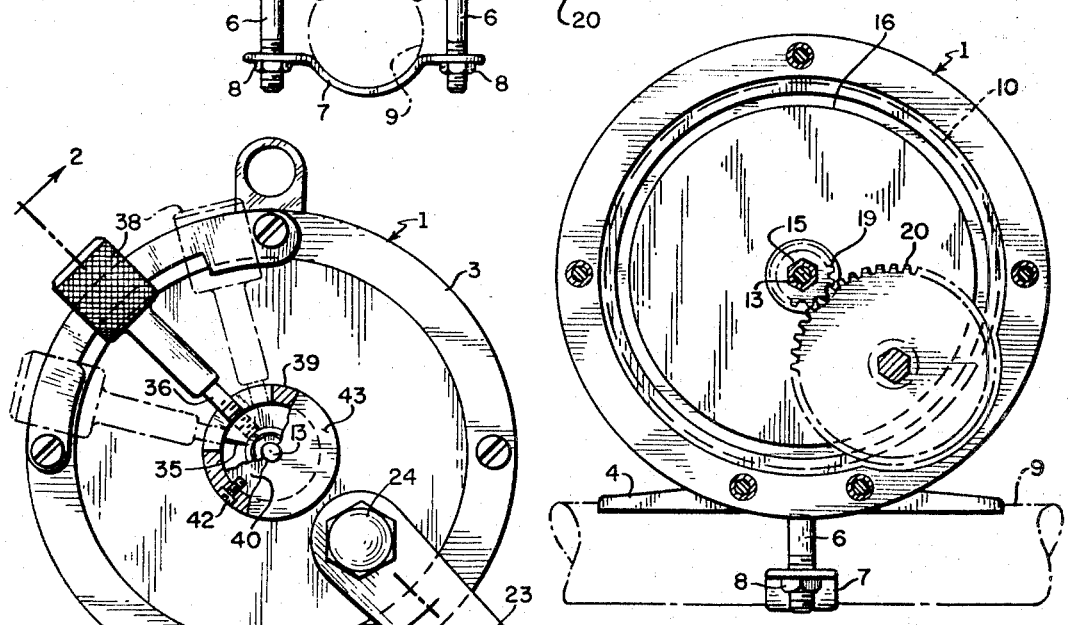
FIG. 5 is a sectional view, taken substantially on the line 5—5 of FIG. 2, looking in the direction of the arrows.

The improved reel includes a body or housing generally indicated at 1 and which includes end plates respectively indicated at 2 and 3, said plates being connected together and held in the required spaced relationship by spacer rods 5 and a crosspiece 4. Studs 6 project from the crosspiece 4 and receive a clamping plate 7 which, by means of the nuts 8 received on said studs, holds the reel in place on a fishing rod 9.

The spool of the reel is shown at 10, the same being provided with a hollow or tubular hub 11 which is rotative on the ball bearings shown at 12. Axially disposed within the hub 11 is a shaft 13 forming part of the axle structure for the reel, said shaft being surrounded by a sleeve 14, having a non-round or hexagonally shaped end portion 15 rotative in a bearing 17 in the end plate 3 of the housing. A brake disk 16 is carried by and is slidably adjustable on the end portion 15, said disk being adapted for contact with the adjacent flange of the spool with regulatable pressure. A spring 18 surrounds the part 15 and is interposed between the brake disk 16 and the bearing 12, said spring tending to bias the disk 16 in a direction away from the adjacent end flange of the spool 10.

Carried on the part 15 is a pinion 19 engaging with a gear 20, which in the embodiment shown in FIG. 4, is carried on a crank shaft 21 mounted for rotative movement in a boss 22 projecting from the end plate 3 of the reel housing. The crank arm shown at 23 is suitably attached to the shaft 21 by means of the screw 24 and suitably interposed washers. A crank handle or knob 25 is attached at the end of the crank arm as is clearly shown in FIG. 4.

At one end of the sleeve 14 is a shown a thrust bearing 26, and said sleeve is provided with an hexagonally shaped or non-round outer shaft portion 27 surrounded by a slidable dog 28 adapted for engagement with a dog on the part 15. A coil spring 30 surrounds the shaft portion 27 and tends to bias the dog 28 into engagement with the dog 29. This arrangement is such as to provide for an anti-reverse action of the spool.

The reel includes a signalling device shown at the lower left in FIG. 4, the same including the provision of a number of depressions or recesses 32 in a face of one of the flanges of the spool, said recesses being successively engaged, when the spool is rotated, by a spring-pressed plunger or detent 33, so that a clicking noise will be caused to indicate that a fish is on the line. A knob 34, connected to the plunger or detent 33, is used to hold the plunger or detent in a retracted position to thereby free it from contact with the flange of the spool when desired.

Means is provided for the adjustment of the braking force or drag on the spool, such means including a cam 35, arranged around the end portion of the shaft 27 and threadably engaged with the end of a rod 36, biased by a spring 37, contained within a lever 38. Secured to the outer face of the end plate 3 of the housing by means of a screw 41 is a cam housing 39 containing a cam 40, held to the housing 39 by means of a screw 42. An adjusting nut 43, threadably fitted on the end of the shaft 13 holds the cam 40 in position.

Figure 1:
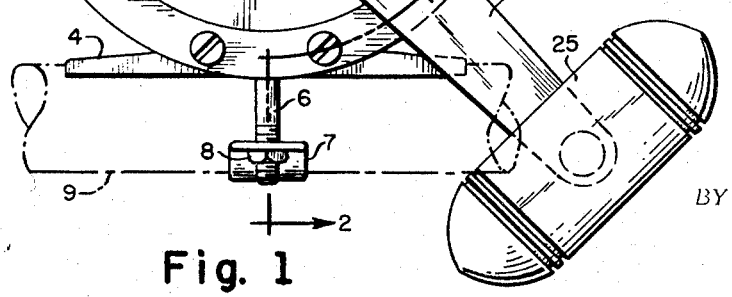

As is clearly shown in FIG. 1 the lever 38 is capable of arcuate swing so that the face of the movable cam 35, operative against the opposing face of the cam 40, will axially move shaft 13 and shaft portion 27 against the bias of the spring 30 and will cause the brake disc 16 to be applied with the desired or required force, to the adjacent flange of the spool 10 by movement of the spool.

The embodiment shown in FIG. 2 is similar in most respects to that shown in FIG. 4, except that in the embodiment of FIG. 2, a ratchet means is provided by which a back-and-forth or reciprocating movement or swing of the crank can be had when desired in order to facilitate the reeling-in of the line when a substantial pull is being exerted on the line by a fish and particularly a large or vigorous fish. In this embodiment of the invention, the gear 20 is carried on an inner shaft section 50 which is octagonal in cross section or otherwise of non-round contour. Said shaft section carries a slidably mounted ratchet element 51 that is spring-biased by a spring 52 to engage with a ratchet member 53 that is carried by a second section 58 of the crank shaft. The two sections of the crank shaft are axially aligned. The crank arm 23 is fitted on the non-round portion 54 of the shaft section 58 and is held thereon by means of a nut 55 and an interposed washer 56. The crank arm 23 carries the handle or knob 25 as described in connection with the previous embodiment.

The construction and advantages of the described reel will be apparent to those skilled in this art. By the arcuate swing or adjustment of the cam lever 38 and as disclosed in FIG. 1, the required brake or drag action on the spool will be regulated. When a fish is hooked which will exert a powerful pull on the line and to such an extent that the fisherman finds that the rotative movement of the crank becomes very difficult, the ratchet coupling, consisting primarily of the ratchet members 51 and 53 will enable the crank handle to be rocked with a back-and-forth movement to thereby gradually and with a step-by-step movement rotate the spool and thus bring in the pull-exerting fish.

Now, further with respect to the anti-reverse clutch members 28 and 29, the clutch member 28 is slidable but non-rotative upon the non-round inner portion of the shaft 27 and biased toward the clutch member 29 by the spring 30. The outer end of the shaft 27 being also hexagonal, seats within a hexagonal recess of a cylindrical plate 27a that projects beyond the side wall of the end plate 2 and is covered by a housing 21a, fixed to the end plate 2, by screws 22a. The shaft 13 extends through the shaft 27, having its inner end fixed to the plate 27a and its opposite end threaded to be engaged by the nut 43.

As the handle 38 is swung, the cam 35 is rotated against the cam 40, creating a sliding movement of the shaft 13 and increasing or decreasing the pressure of clutch members 28 and 29 and to simultaneously vary the pressure of the brake 16 against the adjacent face of the spool.

The disposition of the anti-reverse drive clutch in a hollow cylindrical opening of the spool 10, is believed to be novel with the inventor however, it should be clearly apparent that such a clutch system may also be employed with a solid spool construction having the anti-reverse system contained in the end plate.

Having thus described embodiments of the invention, it is obvious that the same is not to be restricted thereto, but is broad enough to cover all structures coming within the scope of the annexed claims.

What I claim is:

1. In a fishing reel, a pair of spaced end plates secured together in fixed spaced apart relation, a spool rotatable between the end plates and with the spool having a hollow cylindrical hub, ball bearings fixed into the opposite ends of the spool axially with respect to the hub, a shaft extending through the hub, an anti-reverse means comprising first and second toothed segments contained in said spool hub, shaft means extending axially from one end of said spool hub and non-rotatably fixed to one of said end plates for mounting the first toothed segment for slidable but non-rotatable movement with respect to said end plate, spring means in said spool hub biasing said first toothed segment for yieldable engagement with said second toothed segment, a sleeve overlying the shaft and with the sleeve having a non-cylindrical portion, the non-cylindrical portion of said sleeve carrying the second toothed segment, a brake disk and pinion, said brake disk frictionally engaging an end of said spool, drive means for rotating said pinion, sleeve and brake disk carried thereby to frictionally rotate said spool in a winding directon, the shaft extendng through the sleeve and through one end plate and threadedly engaged with an adjusting nut of a cam means carried upon the outer side of one end plate thereby to shift said shaft and spool toward said brake disk to vary the pressure engagement of the disk against said spool, said anti-reverse means serving to prevent reverse rotation of said brake disk to thereby frictionally retard rotation of the spool in the unwinding direction.

2. A fishing reel according to claim 1 wherein said drive means includes a crank having a shaft offset in relation to the axis of the spool, said shaft being composed of a plurality of axially aligned sections, each of said sections carrying a ratchet element, a spring for biasing one of the ratchet elements into engagement with the other ratchet element, the crank being carried by one of the shaft sections, and the other shaft section carrying a gear.

3. In a fishing reel, a pair of spaced end plates secured together in fixed spaced apart relation, a spool rotatably mounted on and between said end plates, shaft means coupled to said spool axially thereof and having at least first and second concentric separate shaft portions with said first shaft portion being non-rotatable and said second shaft portion being rotatable, an anti-reverse means comprising first and second clutch segments having teeth on confronting faces thereof and mounted on said shaft means, said first clutch segment being non-rotatable and slidable axially of said first portion of said shaft means, spring means urging said first clutch segment for yieldable engagement with said second clutch segment, said second portion of said shaft means carrying the second clutch segment and a brake disk for rotation, said brake disk frictionally engaging an end of said spool, and drive means for rotating said second shaft portion and said brake disk to frictionally rotate said spool in a winding direction, said anti-reverse means serving to prevent reverse rotation of said brake disk to thereby frictionally retard rotation of the spool in the unwinding direction.

References Cited

UNITED STATES PATENTS

| | | | |
|---|---|---|---|
| 778,244 | 12/1904 | Howard | 242—84.54 |
| 2,417,732 | 3/1947 | Bland et al. | 242—84.54 X |
| 2,531,610 | 11/1950 | Butzman | 242—84.46 X |
| 3,184,179 | 5/1965 | Wood | 242—84.54 X |
| 3,251,564 | 5/1966 | Neale | 242—84.54 X |
| 3,315,913 | 4/1967 | Grieten | 242—84.45 |

BILLY S. TAYLOR, *Primary Examiner.*